(12) United States Patent
Allavarpu et al.

(10) Patent No.: US 7,206,843 B1
(45) Date of Patent: Apr. 17, 2007

(54) THREAD-SAFE PORTABLE MANAGEMENT INTERFACE

(75) Inventors: Sai V. Allavarpu, Pleasanton, CA (US); Rajeev Angal, San Jose, CA (US); Anand J. Bhalerao, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/553,971

(22) Filed: Apr. 21, 2000

(51) Int. Cl.
 *G06F 15/177* (2006.01)
 *G06F 9/50* (2006.01)
 *G06F 9/44* (2006.01)
 *G06F 13/00* (2006.01)

(52) U.S. Cl. .................. 709/226; 718/104; 718/102; 709/223; 719/313; 719/316; 719/314

(58) Field of Classification Search ............... 709/100, 709/101, 223–226; 718/100–108, 1; 719/310–332
See application file for complete search history.

(56) References Cited

U.S. PATENT DOCUMENTS

| | | | |
|---|---|---|---|
| 5,406,557 A | 4/1995 | Baudoin | |
| 5,452,459 A * | 9/1995 | Drury et al. ................. | 707/3 |
| 5,511,122 A | 4/1996 | Atkinson | |
| 5,586,260 A | 12/1996 | Hu | |
| 5,632,032 A | 5/1997 | Ault et al. | |
| 5,647,002 A | 7/1997 | Brunson | |
| 5,732,270 A | 3/1998 | Foody et al. | |
| 5,848,243 A | 12/1998 | Kulkarni et al. | |
| 5,870,749 A | 2/1999 | Adusumilli | |
| 5,892,950 A | 4/1999 | Rigori et al. | |
| 5,941,978 A | 8/1999 | Finni | |
| 5,953,530 A | 9/1999 | Rishi et al. | |
| 5,974,438 A * | 10/1999 | Neufeld ..................... | 709/104 |
| 5,983,233 A | 11/1999 | Potonniee | |
| 6,018,743 A | 1/2000 | Xu | |

(Continued)

OTHER PUBLICATIONS

Stevens, W. Richard. "UNIX Network Programming." Chapter 3, Interprocess Communication. pp. 87-152. 1990.*

(Continued)

*Primary Examiner*—Lewis A. Bullock, Jr.
(74) *Attorney, Agent, or Firm*—Robert C. Kowert; Meyertons, Hood, Kivlin, Kowert & Goetzel, P c

(57) ABSTRACT

A system and method for using a management interface such as Portable Management Interface (PMI) in a thread-safe and efficient manner. A secondary scheduler receives PMI management requests from multi-threaded manager applications in a thread-safe manner, such as through a lock. The secondary scheduler monitors the flow of PMI-related requests into PMI to ensure that, at any point in time, only one management request (e.g., callback function) is running on the PMI thread. When a request in the secondary queue is ready for scheduling with the primary scheduler, the secondary scheduler then accesses the primary scheduler in a thread-safe manner, such as through a lock, to send the request to the primary scheduler. The management requests are dispatched from the primary scheduler and executed on managed objects though a Management Information Server. The performance and efficiency of the manager applications is enhanced by increasing the responsiveness of interaction between the manager applications and the schedulers. The performance of the management interface is enhanced by eliminating the need for polling-based scheduling solutions.

35 Claims, 9 Drawing Sheets

U.S. PATENT DOCUMENTS

| | | | |
|---|---|---|---|
| 6,023,579 | A | 2/2000 | Hellgren et al. |
| 6,042,614 | A | 3/2000 | Davidson et al. |
| 6,085,240 | A | 7/2000 | Suzuki et al. |
| 6,105,053 | A * | 8/2000 | Kimmel et al. ............. 718/105 |
| 6,176,883 | B1 | 1/2001 | Holloway et al. |
| 6,202,199 | B1 | 3/2001 | Wygodny et al. |
| 6,205,482 | B1 | 3/2001 | Navarre et al. |
| 6,208,345 | B1 | 3/2001 | Sheard et al. |
| 6,209,018 | B1 | 3/2001 | BenShachar et al. |
| 6,247,039 | B1 | 6/2001 | Callsen |
| 6,282,579 | B1 | 8/2001 | Carre |
| 6,282,701 | B1 | 8/2001 | Wygodny et al. |
| 6,289,393 | B1 | 9/2001 | Phillips et al. |
| 6,301,557 | B1 * | 10/2001 | Miller et al. ................ 704/223 |
| 6,317,428 | B1 | 11/2001 | Mercouroff et al. |
| 6,321,337 | B1 | 11/2001 | Reshef et al. |
| 6,324,648 | B1 | 11/2001 | Grantges, Jr. |
| 6,330,598 | B1 | 12/2001 | Beckwith et al. |
| 6,343,332 | B1 | 1/2002 | Ueda |
| 6,356,930 | B2 | 3/2002 | Garg |
| 6,378,124 | B1 | 4/2002 | Bates et al. |
| 6,378,125 | B1 | 4/2002 | Bates et al. |
| 6,418,458 | B1 * | 7/2002 | Maresco ..................... 718/103 |
| 6,421,676 | B1 * | 7/2002 | Krishnamurthy et al. ... 707/102 |
| 6,445,776 | B1 | 9/2002 | Shank et al. |
| 6,467,052 | B1 | 10/2002 | Kaler et al. |
| 6,496,833 | B1 | 12/2002 | Goldberg et al. |
| 6,530,079 | B1 | 3/2003 | Choi et al. |
| 6,539,501 | B1 | 3/2003 | Edwards |
| 6,680,933 | B1 * | 1/2004 | Cheesman et al. .......... 370/352 |

OTHER PUBLICATIONS

Feridun, M. et al. "Implementing OSI Agent/Managers for TMN." IEEE. Sep. 1996.*

"What is CORBA?," Object Management Group, Inc., 1997-1999, 2 pages.

"CORBA Overview," Object Management Group, Inc., 1995, 13 pages.

"Overview of CORBA," Object Management Group, Inc., Jan. 19, 2000, 4 pages.

"Java, RMI and CORBA, " Object Management Group, Inc., 1997-1999, 8 pages.

"A CORBA Primer," Technical Overview, A White Paper, Segue Software, 7 pages.

"Development Environment," Sun Microsystems, Inc., 1994-2000, 11 pages.

"Solstice Enterprise Manager 2.1 Reviewr's/Evaluator's Guide for Telecommunications Network Management," Sun Microsystems, Inc., 1998, pp. 1-45.

"Solstice Enterprise Manager 2.1: A Technical White Paper,", Sun Microsystems, Inc. Chapters 1-6, 68 pages, 1997.

"Solstive Enterprise Manager 3.0: Satisfying the Needs of Telecom Carriers & Service Providers," Sun Microsystems, Inc., 1994-2000, 3 pages.

"Joint Inter Domain Management (JIDM)," The Open Group, Jan. 10, 2005, 5 pages.

"Specification of Abstract Syntax Notation One (ASN.1)," International Telecommunication Union, ITU-T Recommendation X.208, 1988 and 1993, pp. 1-72.

"Specification of Basic Encoding Rules for Abstract Syntax Notation One (ASN.1)," International Telecommunication Union, ITU-T Recommendation X.209, 1988 and 1993, pp. 1-23.

"Inter-Domain Management: Specification Translation,", The Open Group, 1997, 281 pages.

"CORBA-Based Telecommunication Network Management Systems," Object Management Group, Inc., May 1996, pp. 1-29.

"Intelligent Networking with CORBA, *A White Paper*," Nortel, et al., Draft 2.0, Oct. 31, 1996, pp. 1-7.

"Inter-Domain Management Between CORBA and SNMP: WEB-Based Management-CORBA/SNMP Gateway Approach," Subrata Mazumdar, Lucent Technologies, 1996, pp. 1-16.

"Mapping of Common Management Information Services to CORBA Objects Services Specification," Subrata Mazumdar, Lucent Technologies, Mar. 10, 1997, pp. 1-68.

"A Discussion of the Object Management Architecture," Object Management Group, Inc., Jan. 1997, pp. 1-1 to 1-6, 2-1 to 2-6, 3-1 to 3-8, 4-1 to 4-12, A-1 to A-8.

"CMIS/C++: Application Programming Interface," Network Management Forum, Issue 1.0, Feb. 1998, pp. 1-226.

"JIDM Interaction Translation," Final Submission to OMG's CORBA/TMN Interworking RFP, Object Management Group, Inc. Edition 4.3, OMG Document No. telecom/98-10-10, Oct. 1998, 273 pages.

Guy Genilloud, "An Analysis of the OSI Systems Management Architecture from an ODP Perspective," IEEE, 1996, pp. 72-81.

N. Lynch, et al., "Web Enabled TMN Manager," Telecommunications, Conference Publication No. 451, Apr. 1, 1998, pp. 121-126.

* cited by examiner

THREAD-SAFE PORTABLE MANAGEMENT INTERFACE

BACKGROUND OF THE INVENTION

1. Field of the Invention

The present invention relates generally to computer software. More particularly, the present invention relates to network management software.

2. Description of the Relevant Art

The field of network management involves the management of networked devices, often remotely. A computer network is a linked group of two or more computers. Generally, networks may be classified as Local-Area Networks (LANs) or Wide-Area Networks (WANs). In a LAN, the computers or devices are typically connected together within a "local" area such as a home, office, or group of offices. In a WAN, the computers or devices are typically separated by a greater distance and are often connected via telephone/communication lines, radio waves, or other suitable means of connection.

Networks are usually classified using three properties: topology, protocol, and architecture. Topology specifies the geometric arrangement of the network. Common topologies are bus, ring, and star configurations. A network's protocol specifies a common set of rules and/or signals, such as Ethernet or Token Ring, that the networked devices use to communicate with each other. A network's architecture typically specifies one of the two major types of network architecture: peer-to-peer or client/server. In a peer-to-peer networking configuration, there is no server, and computers simply connect with each other in a workgroup to share files, printers, services, and Internet access. Client/server networks often include a domain controller to which all of the networked computers log on. This server may provide various services such as centrally routed Internet access, e-mail, file sharing, printer access, and security services.

Many types of devices may be managed over a network, such as printers, scanners, phone systems, copiers, and many other devices and appliances configured for network operation. Typically, such devices are managed via requests and events. A request is a message sent to a managed object. A request may be sent by a manager application to a managed object to query the object about a particular parameter associated with the object. A request may also be sent to a managed object to modify a parameter of the object. Alternately, an event is a message originating with a managed object. Events may be sent by managed objects to signal some change of state of the managed object, or to communicate information about the managed object. Managing such devices tends to require that the data types of each device's control parameters and signals be well defined. For example, a networked printer might have a Boolean status parameter which indicates whether the device is currently on or off and a control parameter which turns the printer on or off. A manager application may send a request to determine the on/off status of the printer. Then, once the status is determined, say, to be off, a subsequent request may be sent to modify the control parameter to turn the printer on. The printer may also be capable of generating an alert signal indicating, for example, that the toner level is low. In this case, an event communicating that fact may be sent by the managed object (the printer) to the appropriate manager application.

The network management software should be able to read and write these data correctly in order to manage the device. To do this, information about the data is required. Such information is referred to as metadata, or "data about data." Metadata may typically describe what type of data (string, integer, Boolean, structure) an object has and how the data are formatted. Metadata is essential for understanding information related to managed devices, as well as information stored in data warehouses. Typically, network management software manages a given device by storing and manipulating a representation of its pertinent data as a software object, herein referred to as a "managed object." This object is the virtual representation of the device on the network.

FIG. 1a illustrates an example of typical elements of a telecommunications network. The telecommunications world is characterized by devices such as cell phones, cell phone towers and other kinds of towers 156, phone systems 151, faxes 152, routers 153, switches 154, satellite dishes 155, etc., which may be interconnected via networks 108a. In response to the network management needs of this technology sector, a conceptual framework for telecom network management called Telecommunications Management Network (TMN) was developed by the Telecom Management Forum (TMF). TMN defines the relationship between basic network building blocks, such as network elements, different network protocols, and operations systems, in terms of standard interfaces. Generally, a TMN system includes Agent hardware 150, Manager software 170, and Agent software 160. The Agent hardware 150 includes the managed devices such as those shown in FIG. 1a. The Manager software 170 includes any application used to manage a networked device. These manager applications, or client applications, may be installed and executed on one or more client computer systems 171a, 171b, . . . , 171n. The Agent software 160 includes the software interface between the Manager software 170 (for communications via network 108b) and the Agent hardware 150 (for communications via network 108a). The Agent software 160 may be installed and executed on one or more server computer systems 161a, 161b, . . . , 161n. In some instances, the Agent software 160 and Manager software 170 may be installed and executed on the same computer system. The Agent software 160 may also reside, in whole or part, on the Agent hardware 150 itself.

A middleware standard used extensively in network management is the Common Object Request Broker Architecture (CORBA), which is provided by the Object Management Group (OMG). CORBA specifies a system that provides interoperability between objects in a heterogeneous, distributed environment and in a way transparent to the programmer. Its design is based on the OMG Object Model, which defines common object semantics for specifying the externally visible characteristics of objects in a standard and implementation-independent way. In this model, clients request services from objects (which will also be called servers) through a well-defined interface. This interface is specified in the OMG Interface Definition Language (IDL).

In CORBA, a client accesses an object by issuing a request to the object. The request is an event, and it carries information including an operation, the object reference of the service provider, and actual parameters, if any. The object reference is an object name that reliably defines an object.

A central component of CORBA is the Object Request Broker (ORB). The ORB encompasses the communication infrastructure necessary to identify and locate objects, handle connection management, and deliver data. In general, the ORB is not required to be a single component; it is simply defined by its interfaces. The basic functionality provided by the ORB includes passing the requests from clients to the object implementations on which they are invoked. The ORB acts as the middleware between clients and servers. In the CORBA model, a client can request a service without knowing anything about what servers are attached to the network. The various ORBs receive the requests, forward them to the appropriate servers, and then hand the results back to the client.

In CORBA, a client first looks up the object (server) it wants to communicate with. The ORB, as a result of the lookup operation, returns an object reference (a handle) of the server to the client. The client then uses the object reference to invoke operations on the object as a function call in the chosen programming language. The ORB intercepts the client request, collects the information about the operation and the request parameter values, encodes it in IIOP, and sends it to the object (server). The ORB on the object side (server) translates the request into a programming language specific function call on the server object. The server object then processes the request and returns a response, if any. The ORB intercepts the response, encodes the response and its parameters into IIOP, and sends it to the client. The ORB on the client side then returns the response to the client as the return value of the function call originally made as part of issuing the request.

One example of a network management system which makes use of the CORBA ORB is Solstice Enterprise Manager™ (SEM) from Sun Microsystems, Inc. SEM relies on an application programming interface (API) named Portable Management Interface (PMI) for development of management applications. PMI may be used for communication between client manager applications and a Management Information Server (MIS). An MIS may provide direct communication with and/or manipulation of managed objects which represent managed devices on the network.

Management interfaces provide event-based (or callback-based) APIs to perform network management operations. PMI is such an event-based API. PMI uses a primary event/callback scheduler to dispatch events/callbacks to the client application. However, a client application could be designed to be multi-threaded, while PMI is single-threaded. A thread is an encapsulation of the flow of control in a program. Single-threaded programs execute only one path through their code "at a time," or concurrently. Multi-threaded programs, on the other hand, may have several threads running through different code paths concurrently (i.e., substantially simultaneously, depending on the number of available processors). A context switch between two threads in a single process is considerably more efficient than a context switch between two processes. In addition, the fact that all data except for stack and registers are typically shared between threads makes them a natural vehicle for expressing tasks that can be broken down into subtasks that can be run cooperatively.

PMI has shortcomings if the client applications involved are multi-threaded. A multi-threaded client application may try to access or update the primary scheduler from different threads in an unsafe manner, potentially resulting in data inconsistencies, access collisions, coherency problems, and other errors. PMI cannot currently be used in a thread-safe manner in multi-threaded management applications, and therefore the scalability and performance of management applications that use PMI may be limited. As used herein, "thread-safe" refers to the property that a program may safely use or be used by multiple threads to avoid, for example, data inconsistencies, access collisions, coherency problems, and other errors.

One approach to making network management operations thread-safe would be to use a global lock to control access to PMI from different threads or processes. Under this approach, a single-threaded scheduler would maintain a queue of pending requests and responses. A "busy wait loop" would scan the PMI scheduler lock at a particular interval to determine whether anything is on the queue to be processed. Use of the busy wait loop might include acquiring the lock, letting a dispatch queue run for a particular number of loops to listen for requests or responses, and releasing the lock. However, it might often be the case that no requests or responses are found, and CPU cycles have therefore been wasted. Furthermore, since every thread would first need to gain access to the lock before accessing the primary scheduler, each such access would result in testing and acquiring the lock at regular intervals. Therefore, use of a busy wait loop would often lead to waste of critical CPU cycles when some threads were idle while others were busy. Such bottlenecks might be thread-safe but would limit the efficiency and performance of the system, including the client applications.

Therefore, improved systems and methods for accessing management interfaces are desired.

SUMMARY OF THE INVENTION

The problems outlined above are in large part solved by various embodiments of a system and method for using a management interface to one or more managed objects in a thread-safe manner. In one embodiment, the management interface is Portable Management Interface (PMI) from Sun Microsystems, Inc. PMI includes a plurality of functions which are operable to carry out management requests. For example, PMI may provide services such as initialization, access to event notification, subscription and propagation services, access to managed object instance information, shared access to information managed by a Management Information Server (MIS), simple syntax for naming of managed objects, and access to metadata information. The management requests may include callback functions which may be executed to send responses back to the appropriate manager applications. In one embodiment, PMI and its functions are single-threaded. Multi-threaded manager applications may interface with a secondary scheduler to route PMI requests to a primary scheduler in a thread-safe and efficient manner.

In one embodiment, a system for using a management interface such as PMI in a thread-safe manner may include a primary scheduler comprising a primary queue. In one embodiment, the primary scheduler is executable in a single, dedicated PMI thread to which all PMI-related program execution may be restricted. The system may also include a secondary scheduler comprising a secondary queue. The secondary scheduler is executable to regulate the flow of management requests from manager applications to the primary scheduler. Access to the secondary scheduler for the manager applications may be provided by an API or other suitable interface, such as PMI. In one embodiment, in other words, the manager applications may call functions of or otherwise pass parameters to an API or interface such as PMI in order to schedule management requests.

The secondary scheduler may receive the management requests from one or more multi-threaded manager applications in a thread-safe manner, such as through a lock or other suitable mechanism. In one embodiment, a thread of a manager application may lock the secondary scheduler, place the request, and then release the lock. The secondary scheduler monitors the flow of PMI-related requests into PMI (e.g., the PMI thread) to ensure that, at any point in time, only one management request or callback function is running on the PMI thread. When a request in the secondary queue is ready for scheduling with the primary scheduler, the secondary scheduler may then access the primary scheduler in a thread-safe manner, such as through a lock or other suitable mechanism, to send the request to the primary scheduler. In one embodiment, the secondary scheduler may lock the primary scheduler, place the request, and then release the lock. In this way, the scheduling of requests by the manager applications with PMI is performed in a thread-safe manner.

Furthermore, the performance and efficiency of the manager applications may be enhanced by increasing the responsiveness of interaction between the manager applications and the schedulers. In other words, the secondary scheduler is locked only while a request is being enqueued on the secondary queue, while the primary scheduler may be locked or otherwise unavailable for longer times, such as during execution of requests pending on the primary queue. Therefore, the multiple threads of one or more manager applications need only wait for a request to be enqueued rather than for the request to be executed before the threads may proceed with their other duties. The performance of the management interface may be enhanced by eliminating the need for polling-based scheduling solutions (e.g., a busy wait loop). In one embodiment, the secondary scheduler may be multi-threaded to further improve the performance of the manager applications.

In one embodiment, a communication pipe may be created to link the primary scheduler and the secondary scheduler. The communication pipe may be used to wake the primary scheduler and pass control to it whenever a management request needs to be scheduled with the primary scheduler. When there is a pending management request to be executed, the management request may be dequeued from the secondary queue. The secondary scheduler may use the communication pipe to wake the primary scheduler. The management request may then be sent to the primary scheduler and enqueued in the primary queue.

The management requests may be dequeued from the primary queue and sent sequentially (i.e., in a proper order relative to other requests) to or otherwise executed on one or more managed objects. The managed objects may include, for example, one or more objects corresponding to a telephone network and/or a telecommunications device. In one embodiment, the managed objects are managed by or through a Management Information Server (MIS). In one embodiment, the MIS is coupled to the primary scheduler through a management interface such as PMI, and the primary scheduler is operable to send the management requests to the one or more managed objects through the MIS. In one embodiment, the management requests comprise callback functions, wherein the callback functions are executable by PMI to send and receive management information to and from the MIS. The MIS is operable to send and receive the management information to and from the managed objects to carry out the management requests.

Responses to the requests may be generated by the managed objects and/or MIS. The primary scheduler may listen for the responses. Upon receipt of a response, the primary scheduler may find and execute the appropriate callback function to send the appropriate response back to the appropriate manager application in a thread-safe and efficient manner similar to the one described above. In one embodiment, the responses may be enqueued in the same primary queue as the requests, pending execution of the appropriate callback functions.

In another embodiment, a primary scheduler and secondary scheduler may be used by multi-threaded applications other than network management applications to pass requests to resources in a similarly thread-safe and efficient manner. The multi-threaded applications may call functions of or otherwise pass parameters to an API or other interface in order to schedule requests. The requests may be scheduled, for example, in order for the multi-threaded applications to obtain information from resources, send information to resources, or perform various tasks on resources. For example, the resources may include databases, servers, and other suitable data sources, repositories, and services. The multi-threaded applications may interface with a secondary scheduler to route the requests to a primary scheduler in a thread-safe and efficient manner.

BRIEF DESCRIPTION OF THE DRAWINGS

Other objects and advantages of the invention will become apparent upon reading the following detailed description and upon reference to the accompanying drawings in which.

Figure 1A:
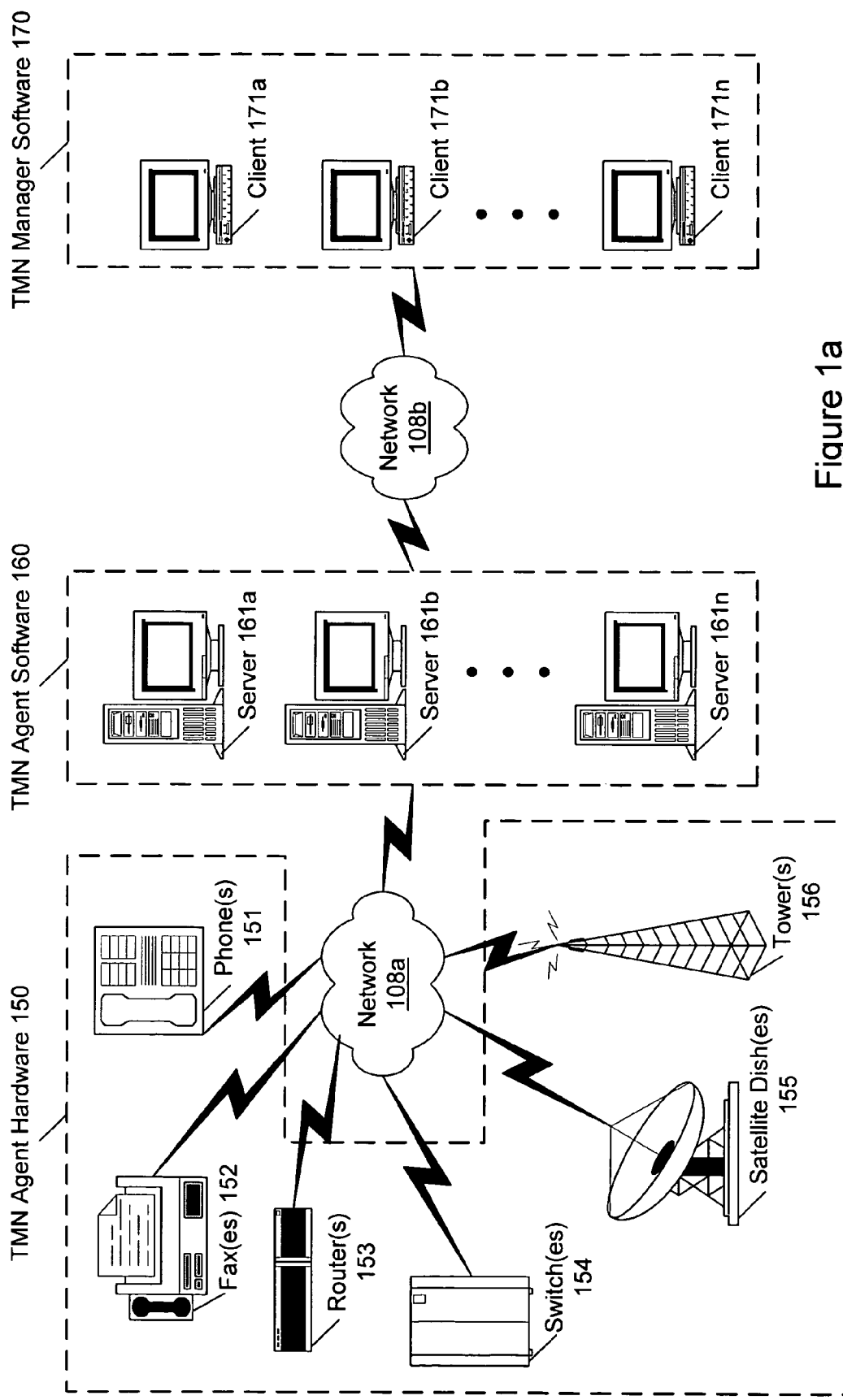
FIG. 1a illustrates an example of typical elements of a telecommunications network.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Figure 1B:
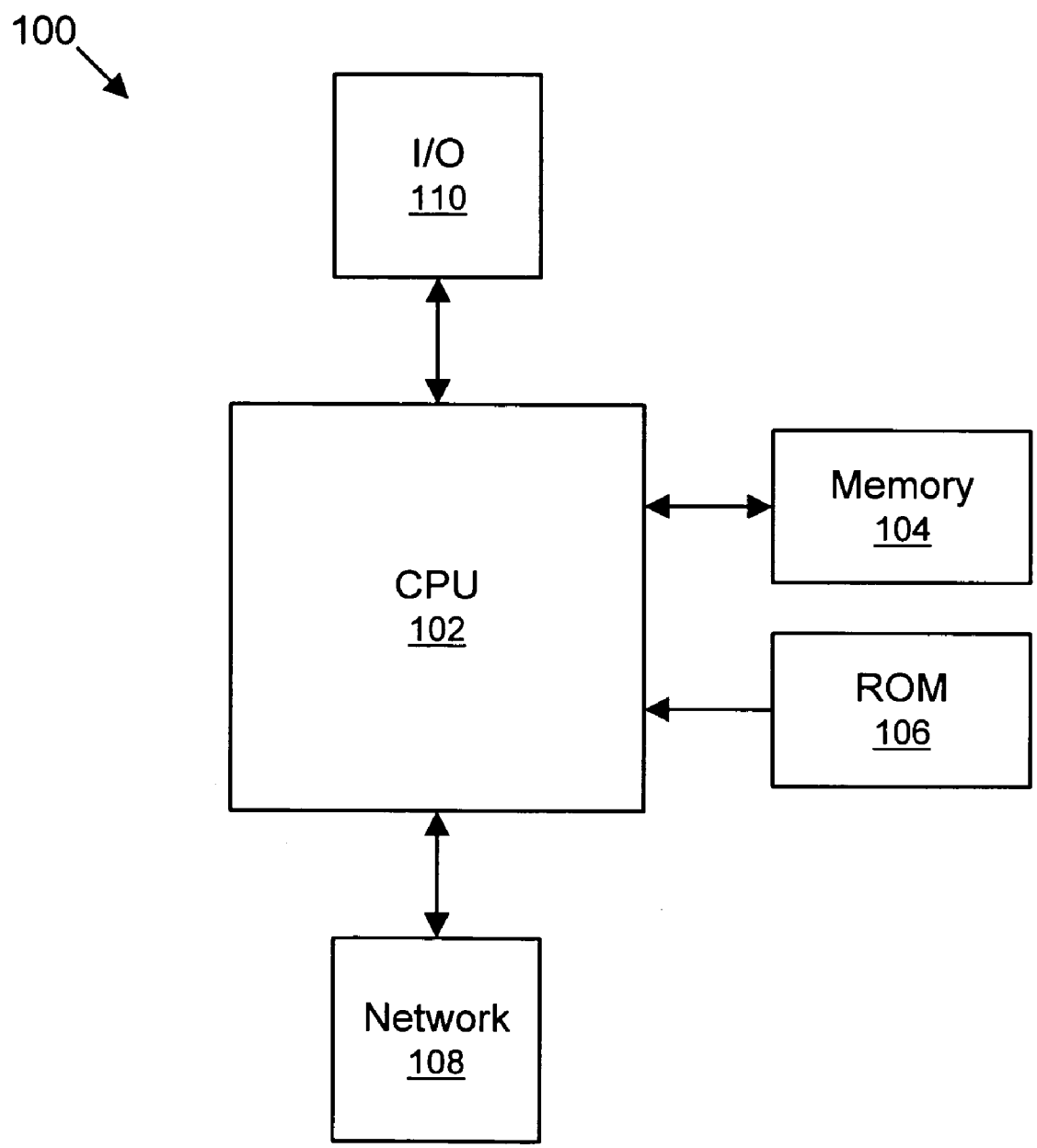
FIG. 1b is an illustration of a typical computer system architecture which is suitable for implementing various embodiments.

FIG. 1b: A Typical Computer System

Turning now to the drawings, FIG. 1b is an illustration of a typical, general-purpose computer system 100 which is suitable for implementing various embodiments of the system and method for network management as disclosed herein. The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory," "memory medium," and "storage medium" may include an installation medium, e.g., a CD-ROM or floppy disk, a computer system memory such as DRAM, SRAM, EDO RAM, etc., or a non-volatile memory such as a magnetic media, e.g., a hard drive or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1b, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system 100 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for network management as disclosed herein may therefore be implemented on a plurality of heterogeneous or homogeneous networked computer systems 100 through one or more networks 108. The CPU 102 may acquire instructions and/or data for implementing system and method for network management as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for network management as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Figure 2:
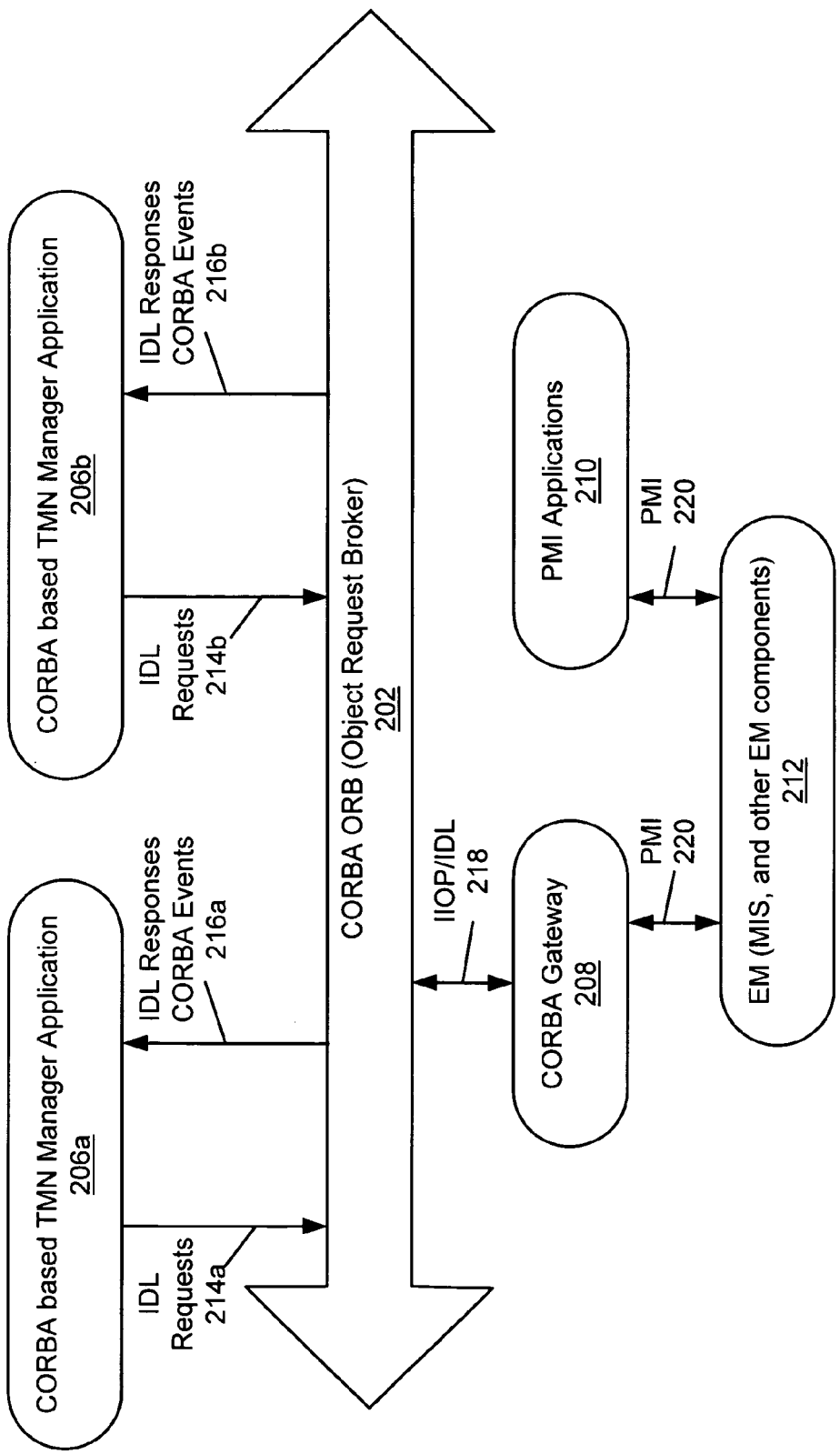
FIG. 2 is an illustration of a CORBA gateway to an enterprise manager according to one embodiment.

FIG. 2: CORBA Gateway

FIG. 2 illustrates a CORBA Gateway between CORBA-based applications and an enterprise manager according to one embodiment. In one embodiment, the CORBA-based system including the CORBA Gateway 208 may be configurable to manage various networked objects, such as printers, scanners, copiers, telephone systems, cell phones, cell phone towers, phone systems, faxes, routers, switches, etc., which may be interconnected via networks. For purposes of simplicity, similar components, e.g., manager applications 206a and 206b, may be referred to collectively herein by a single reference numeral, e.g., 206. As shown in FIG. 2, CORBA-based TMN manager applications 206 may be communicatively coupled to a CORBA Object Request Broker (ORB) 202. The manager applications 206 may be operable to send Interface Definition Language (IDL) requests 214 and receive IDL responses and CORBA events 216 through the CORBA ORB 202. A CORBA Gateway 208 may also be communicatively coupled to the CORBA ORB 202 and be operable to communicate with the CORBA ORB 202 via communications methods 218 such as the Internet Inter-Object Protocol (IIOP), also known as the Internet Inter-ORB Protocol, and IDL. IIOP is a protocol developed by the Object Management Group (OMG) to implement CORBA solutions over the World Wide Web. Unlike HTTP, IIOP enables browsers and servers to exchange integers, arrays, and more complex objects.

In one embodiment, an enterprise manager 212 may be coupled to the CORBA gateway 208 via a proprietary or platform-dependent interface such as Portable Management Interface (PMI) 220 from Sun Microsystems, Inc. The thread-safe PMI described with reference to FIGS. 6 and 7 may be used with the CORBA gateway 208 as well as in many other enterprise and network management environments. The enterprise manager 212 may include various enterprise management components such as a Management Information System (MIS), etc. Also coupled to the enterprise manager 212 via PMI 220 may be one or more PMI applications 210. PMI applications may include, for example, applications which provide access to event notification, subscription, and propagation services and access to object instance information. In one embodiment, the enterprise manager 212 may be Solstice Enterprise Manager™ (SEM) from Sun Microsystems, Inc., and examples of the one or more PMI applications 210 that use PMI to communicate with the SEM MIS may include SEM Viewer, SEM Alarm Manager, SEM Discovery, etc. In one embodiment, the CORBA gateway 208 may translate the CORBA manager requests 214 from IDL to PMI requests 220. Similarly, the CORBA gateway 208 may translate the enterprise manager PMI responses and PMI events 220 to IDL/IIOP responses and events 218 which may be passed on through the CORBA ORB 202 to the manager applications 206 in the form of IDL responses and CORBA events 216.

Figure 3:
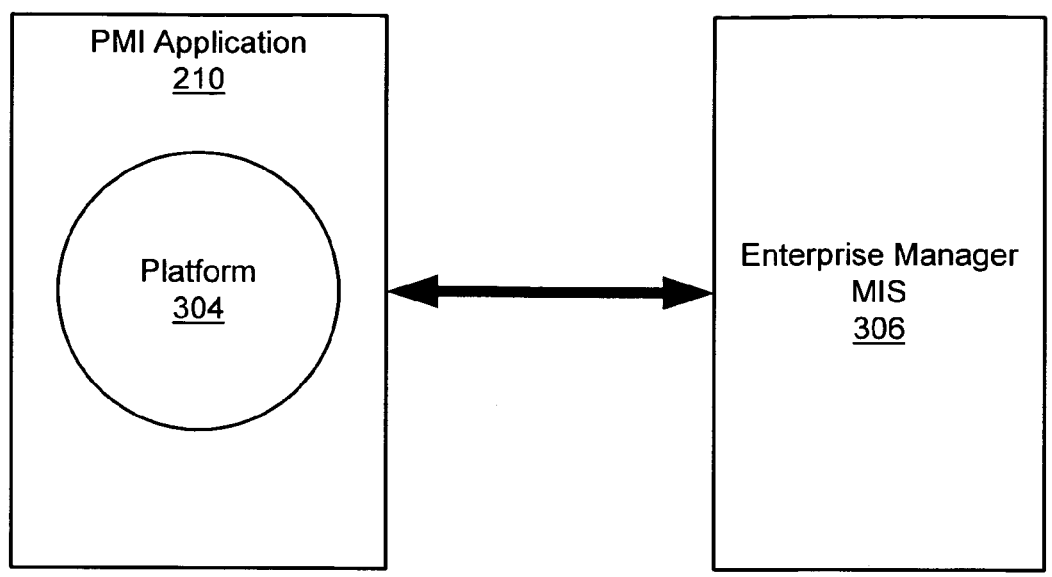
FIG. 3 is an illustration of a PMI Platform class according to one embodiment.
Figure 7:
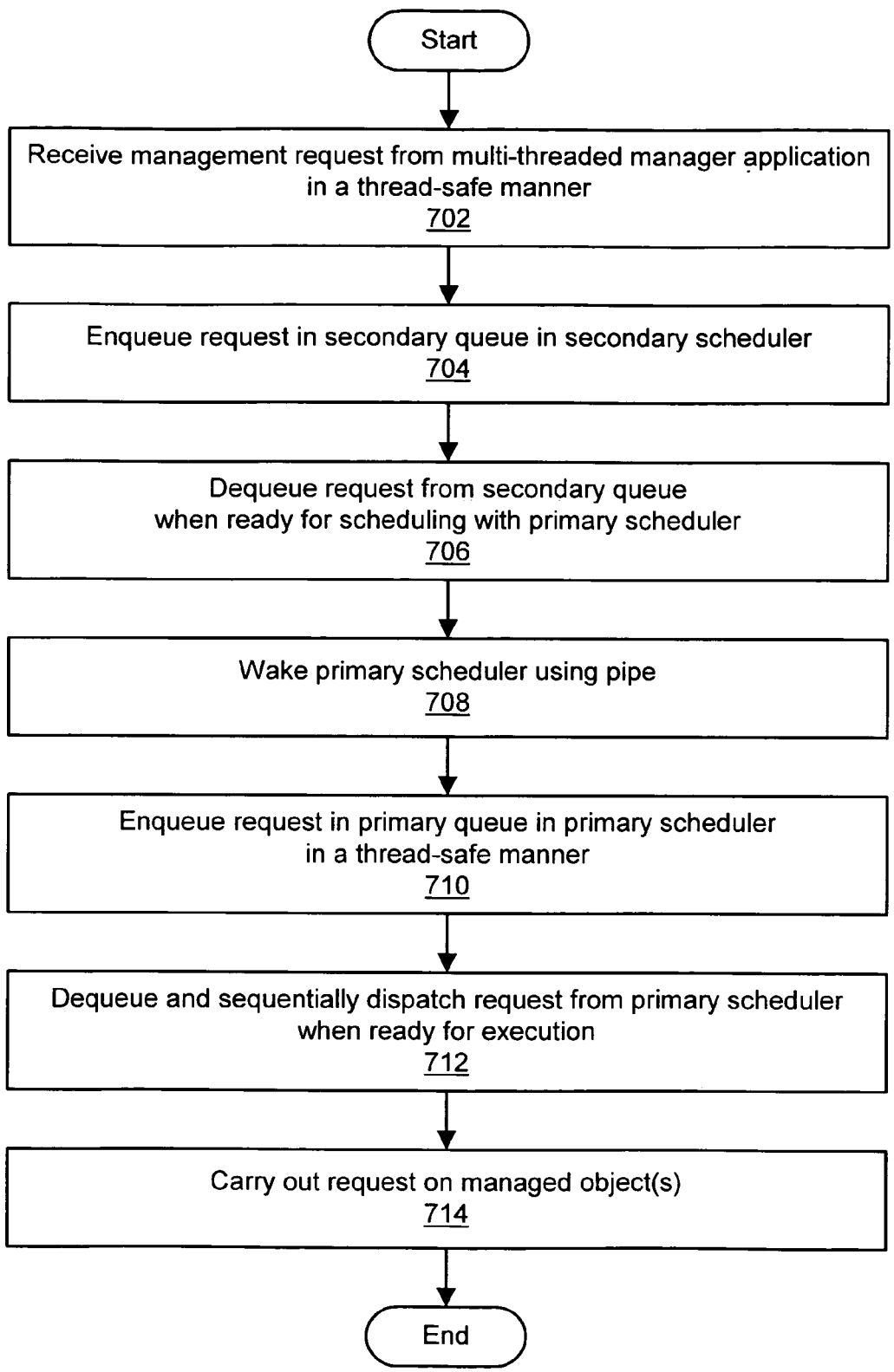
FIG. 7 is a flowchart illustrating a method associated with a thread-safe PMI system according to one embodiment.

In one embodiment, manager applications 206 may request information or issue instructions regarding managed objects on the network via the CORBA Gateway 208. The managed objects may represent devices such as cell phones, cell phone towers, phone systems, faxes, routers, switches, etc., which may be interconnected via networks. Various embodiments of the CORBA Gateway 208 may include one or more components such as a Metadata Gateway, an Event Gateway (as shown in FIG. 3), and a Request Gateway (as shown in FIG. 7). The Metadata Gateway may provide manager applications 206 with metadata relating to the managed devices. The Metadata Gateway may employ a mapping system to translate managed object data and/or metadata between various data formats, such as OMG IDL and a data description language such as Abstract Syntax Notation One (ASN1).

Portable Management Interface (PMI)

PMI is the primary programming interface provided by Solstice Enterprise Manager™ for development of management applications. PMI provides services such as initialization, access to event notification, subscription and propagation services, access to managed object instance information, shared access to information managed by the MIS, simple syntax for naming of managed objects, and access to metadata information (from a metadata repository, for example). As used herein, a "management request" includes, a request issued by a management application to perform any of these and other suitable services. PMI may include two levels of API: namely, a High-Level PMI which is the primary API available for management applications, and a Low-Level PMI which provides management functions/services via operations equivalent to "Get", "Set", etc., and are at a lower level of abstraction relative to the High-Level PMI.

PMI is a generic API. Consequently, a PMI application may consistently deal with the same set of interface classes, regardless of the type of managed object it manipulates. Unlike many other management products which force the user to generate specific C++ classes for each managed object class definition and then rewrite and recompile the application, PMI preserves the user's investment by permitting any managed object to be accessed through the same generic interface.

In one embodiment, PMI provides a small but powerful set of C++ object classes which are high-level abstractions of the real managed objects/entities. PMI provides an API for both requests and events related to managed objects. A PMI client application developer will typically work with a basic set of PMI classes, as described in further detail below.

FIG. 3: The PMI Platform Class

FIG. 3 illustrates a PMI Platform class according to one embodiment. As shown in FIG. 3, a PMI application 210 may be communicatively coupled to an MIS 306. The MIS 306 may be a component of the enterprise manager 212 as illustrated in FIG. 2. In one embodiment, the enterprise manager may be Solstice Enterprise Manager™ from Sun Microsystems, Inc. The PMI application 210 uses a Platform 304 to manage the connection to the MIS 306. The Platform class enables a connection to a specific Solstice EM platform to access management services. The Platform 304 represents an actual or potential connection to the MIS 306, along with all the implied semantics of the particular MIS 306. The Platform object 304 also provides connect, disconnect, and other functions in support of distributed applications and also to support applications that connect to more than one MIS 306.

Figure 4:
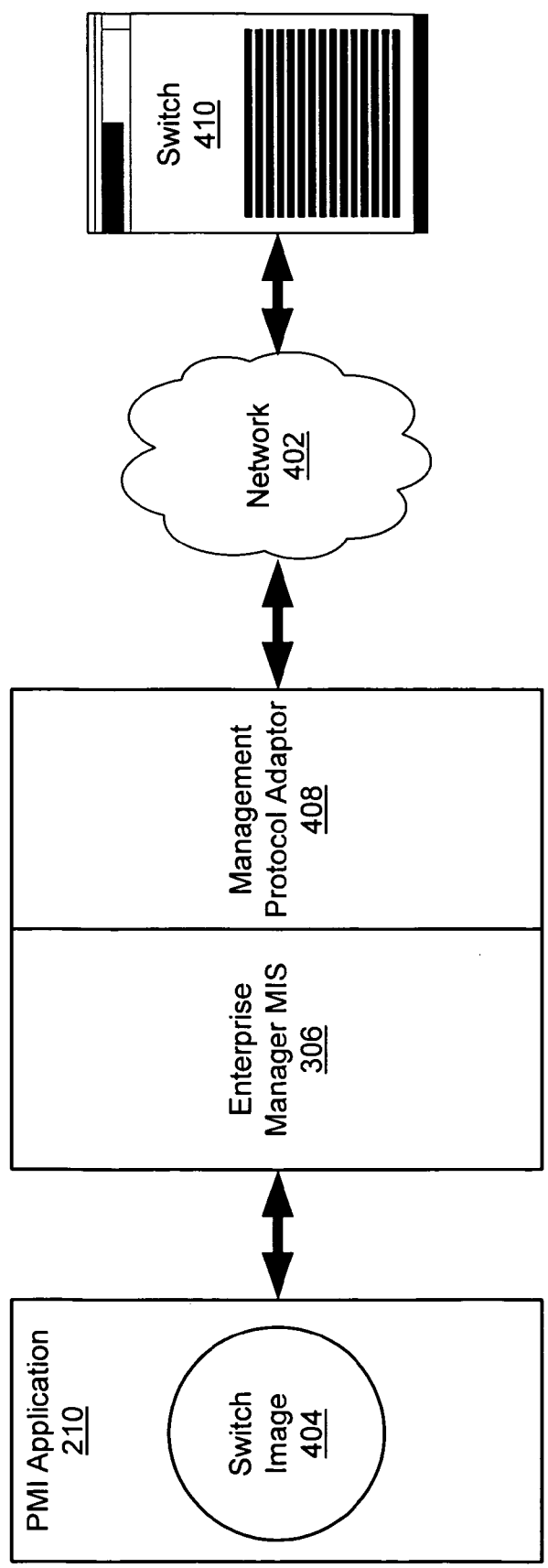
FIG. 4 is an illustration of a PMI Image class according to one embodiment.

FIG. 4: The PMI Image Class

FIG. 4 illustrates a PMI Image class according to one embodiment. The Image class provides a common consistent mechanism for accessing information of any managed object class. As shown in FIG. 4, a PMI application 210 may be communicatively coupled to an MIS 306. The MIS 306 is further coupled to a physical switch 410 through a network 402 via a management protocol adaptor 408. The PMI application 210 uses an Image 404 to manage the switch 410. Typically, an Image is a managed object that represents a physical resource such as a switch, multiplexer, host, server, router, or subnet, or a conceptual entity such as a line, a queue, or some other aspect of network operation that may be represented as a managed object. An Image may be thought of as the object itself, even though the actual object is across the network, or in the MIS. Images provide access to the object's methods and attributes. When representing an actual object, an Image may be synchronized with the object it represents either manually or automatically.

Figure 5:
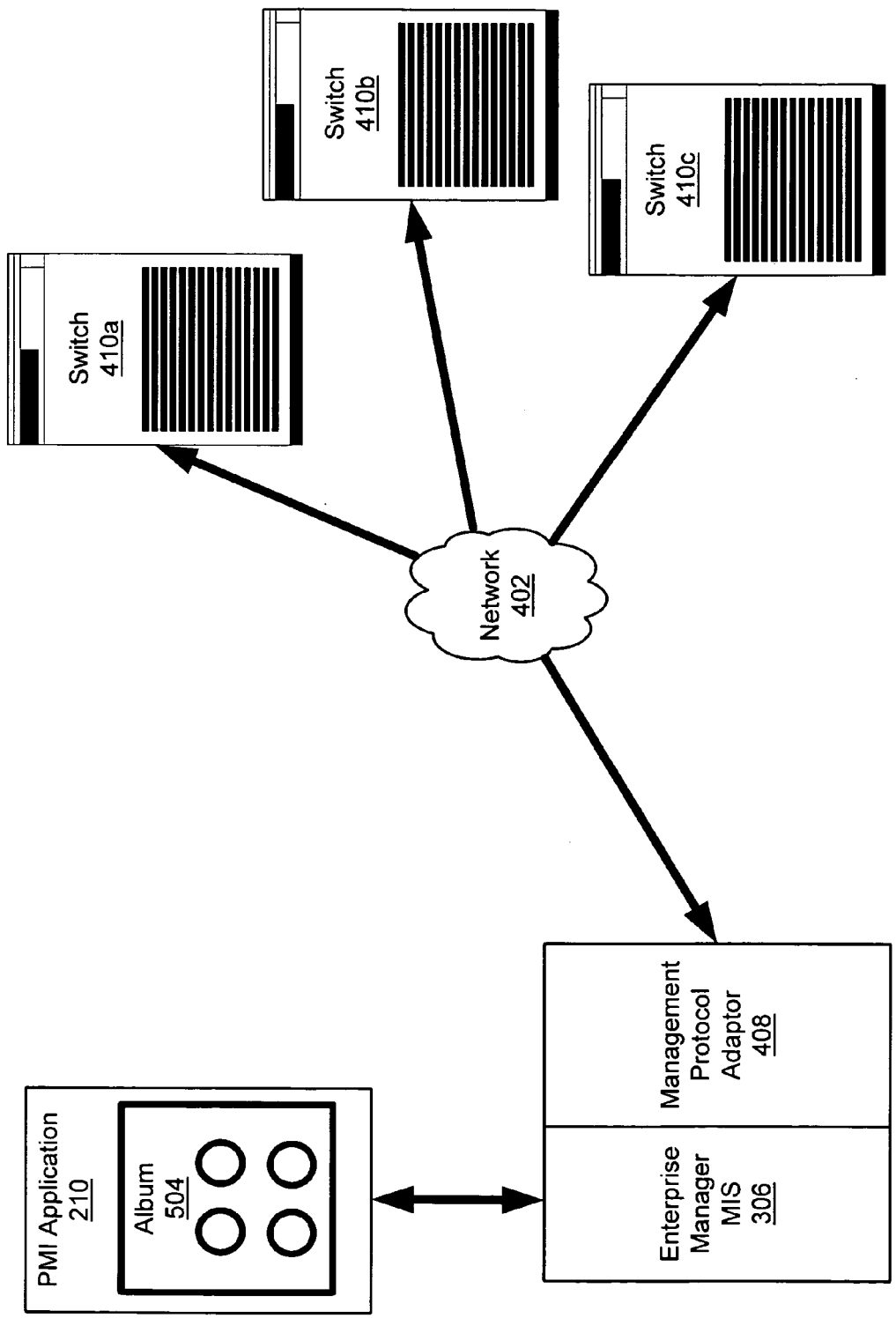
FIG. 5 is an illustration of a PMI Album class according to one embodiment.

FIG. 5: The PMI Album Class

FIG. 5 illustrates a PMI Album class according to one embodiment. As shown in FIG. 5, a PMI application 210 may be communicatively coupled to an MIS 306. The enterprise manager MIS 306 may be further coupled to physical switches 410 through a network 402 via a management protocol adaptor 408. For purposes of simplicity, similar components, e.g., switches 410a, 410b, and 410c, may be referred to collectively herein by a single reference numeral, e.g., 410. In one embodiment, the PMI application 210 may use an Album 504 to manage the switches 410. The Album class provides a common consistent way of accessing collections of Images/objects that are somehow related, such as a set of ISP servers, a collection of all cell switches in a geographical area, etc. An Album may be constructed either by rule or by enumeration. Certain operations may be performed on an Album, and thereby to each of the Images in the Album. Similar to Images, the membership list of an Album may be maintained either manually or automatically. The members of an Album are derived by specifying a scope and optional filter. Whatever objects pass through are included in the Album. An Album may also be constructed using the include and exclude member functions.

In addition to the above-mentioned classes, PMI may provide the following classes for PMI applications. The AlbumImage class provides information about the state of an iterator that is progressing through either all of the Images in an Album or all the Albums in an Image. The CurrentEvent class is the representation of an event. PMI provides a mechanism for applications to request callbacks on the occurrence of specific events. On a callback, the application may interrogate the CurrentEvent parameter to determine the kind of event that occurred. The Morf (Mysterious Object Related to Framework) class provides a mechanism for manipulating abstract data types. The Syntax class provides a mechanism for producing and understanding human-readable representations of data. The Waiter class provides methods for either canceling an ongoing asynchronous operation or awaiting its completion. The Coder class provides custom translation routines to the PMI.

PMI may be used to develop client applications to perform specific network management tasks when there is a need to present information in a specialized fashion that is not possible to achieve using existing Solstice EM components. The presentation of information may include specialized presentation windows, GUI-based device front-ends, or terminal output. PMI may also be used to develop client applications to perform specific network management tasks when there is a need to manipulate information in a manner that is not possible using Solstice EM subcomponents. The manipulation of information may include summarization of data, specialized gathering and processing of data, etc.

Dynamic Addition of Management Information

As indicated above, Solstice EM uses a generic programming interface, PMI, to address managed objects defined using a variety of information models. The advantage of a generic API is that it offers a consistent way of accessing managed object information which is independent of any particular information model. The learning curve and training costs are significantly reduced since programmers need only learn the API once, regardless of which particular managed object model definition approach they use. This makes the development of management applications simple, easy, intuitive, and quick.

Some management platforms offer a specific API; that is, they require a compilation step to preprocess managed object definitions. This step generates C++ classes whose data members and methods reflect the attributes and actions of the object information model. The disadvantage of such an approach is that the preprocessing step to generate source code results in their inability to add new object definitions dynamically to the system at run-time. It may even be required to take the system down and reboot it to support the new definitions.

The PMI approach to a generic API permits the addition of new object definitions dynamically. That is, a running system need not be taken down; rather, it automatically recognizes and works with newly added object definitions. Existing applications will continue to work without interruption with the new metadata in the metadata repository. This approach is better suited to the needs of today's telecom environments because it leverages existing applications, enables flexible and dynamic object model additions, and permits non-stop operation in mission-critical 24×7 (24 hours a day, 7 days a week) environments.

The generic network management object abstractions provided by PMI enable applications to be simple and applicable to most management domains. These applications are not required to be aware of the locations of or management protocols used by the managed resources in the network.

Figure 6A:
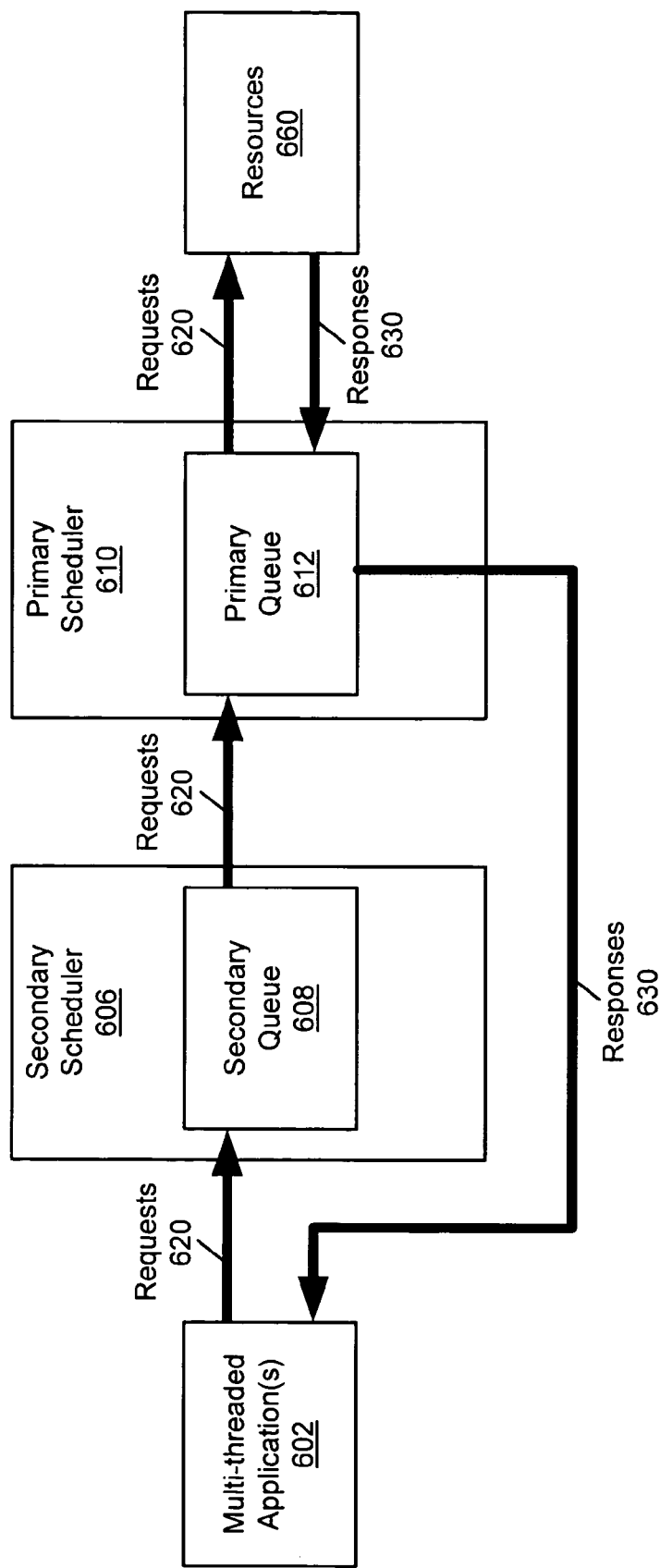
FIG. 6a is an illustration of a thread-safe scheduler system according to one embodiment.

FIG. 6a: A Thread-Safe Scheduler in a Multi-Threaded System

FIG. 6a illustrates one embodiment of a system for using a scheduler in a thread-safe manner with multi-threaded applications. The multi-threaded applications 602 may call functions of or otherwise pass parameters to an API or other interface in order to schedule requests 620. The requests 620 may be scheduled, for example, in order for the multi-threaded applications 602 to obtain information from resources 660, send information to resources 660, or perform various tasks on resources 660. For example, the resources 660 may include databases, servers, and other suitable data sources, repositories, and services. The multi-threaded applications 602 may interface with a secondary scheduler 606 to route the requests 620 to a primary scheduler 610 in a thread-safe and efficient manner.

The secondary scheduler 606 may monitor the flow of requests 620 into the primary scheduler 610 to ensure that, at any point in time, only one request 620 is being executed by the primary scheduler 610 on the resources 660. Each pending request from the multi-threaded applications 602 is placed in the secondary queue 608 for scheduling. In one embodiment, the secondary scheduler 606 is operable to receive the requests 620 from the one or more multi-threaded applications 602 in a thread-safe manner, such as through a lock or other suitable mechanism. In one embodiment, a thread of an application 602 may lock the secondary scheduler 606, place the request 620, and then release the lock. When a request in the secondary queue is ready for scheduling with the primary scheduler, the secondary scheduler 606 may then access the primary scheduler 610 in a thread-safe manner, such as through a lock or other suitable mechanism, to send the requests 620 to the primary scheduler 610. In one embodiment, the secondary scheduler 606 may lock the primary scheduler 610, place the request 620, and then release the lock. In this way, the sending of requests 620 by the multi-threaded applications 602 to the primary scheduler 610 is performed in a thread-safe manner.

Furthermore, the performance and efficiency of the applications 602 may be enhanced by increasing the responsiveness of interaction between the applications 602 and the schedulers 606 and 610. In other words, the secondary scheduler 606 is locked only while a request is being enqueued on the secondary queue 608, while the primary scheduler 610 may be locked or otherwise unavailable for longer times, such as during execution of requests 620 pending on the primary queue 612. Therefore, the multiple threads of one or more applications 602 need only wait for a request 620 to be enqueued rather than for the request 620 to be executed before the threads may proceed with their other duties. In one embodiment, the secondary scheduler 606 may be multi-threaded to further improve the performance of the multi-threaded applications 602. Moreover, the use of the secondary scheduler 606 may permit the elimination of inefficient polling-based solutions to scheduling requests 620.

Additionally, the resources 660 may generate responses 630 upon receipt and processing of the requests 620. In one embodiment, the responses 630 may be sent back to the multi-threaded applications 602 in a thread-safe manner similar to the one described above, i.e., using the primary scheduler 610 to listen for responses 630 and schedule the execution of callback functions and subsequent sending of the responses 630 back to the applications 602.

Figure 6B:
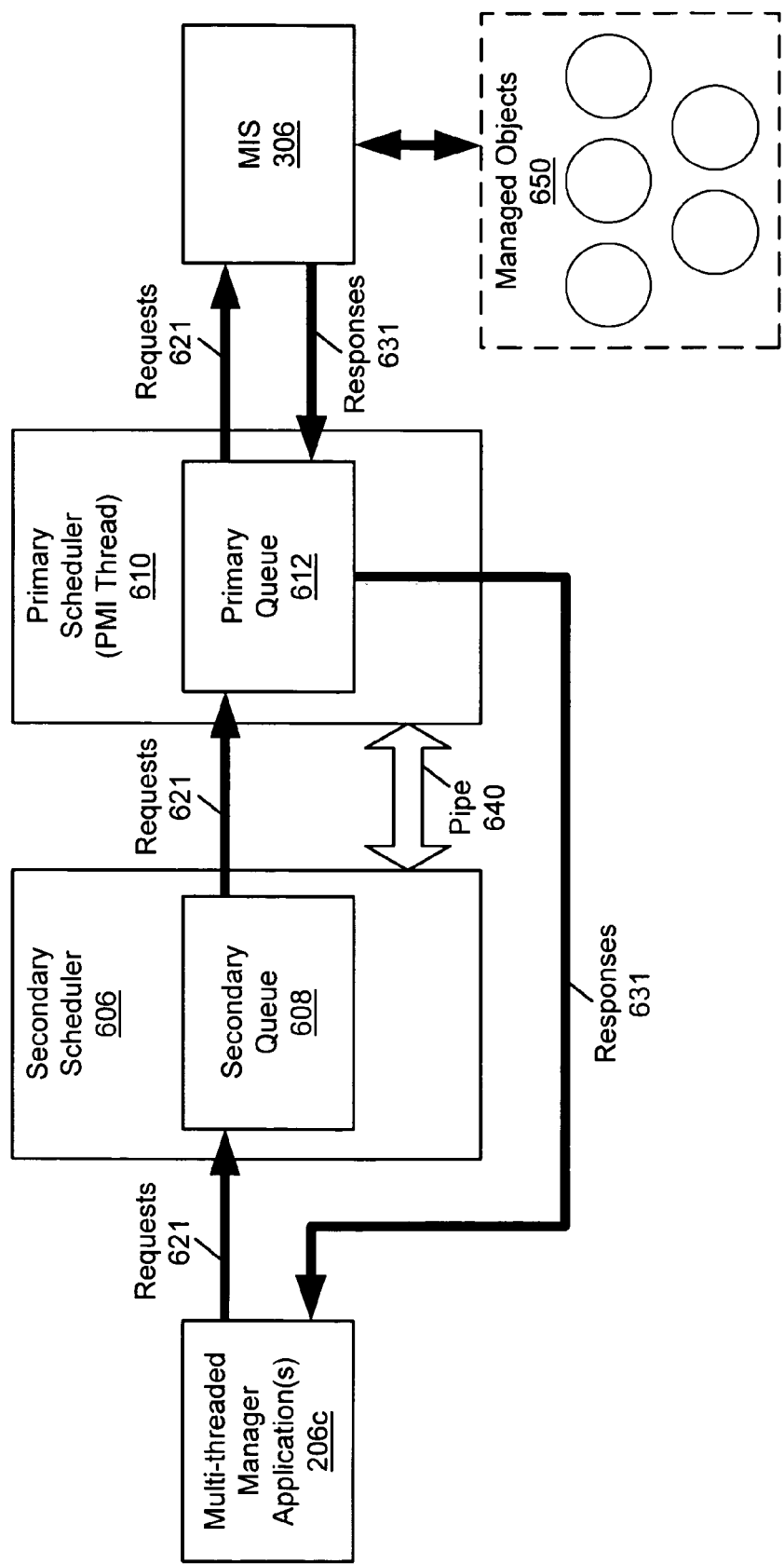
FIG. 6b is an illustration of a thread-safe PMI scheduler system according to one embodiment.

FIGS. 6b and 7: Thread-Safe PMI in a Multi-Threaded System

The approach described with reference to FIG. 6a may be applied to the scheduling of requests with PMI. FIG. 6b illustrates a thread-safe PMI system according to one embodiment. As mentioned above, PMI uses a primary event/callback scheduler to dispatch events/callbacks to and from the client application. With a conventional PMI approach, a manager application would submit a management request along with a callback function (i.e., a function to be performed by the primary scheduler after execution of the request) to the primary scheduler. As discussed above in the Background of the Invention, conventional PMI may use a busy wait loop to scan for requests and/or responses. Upon receiving a request (or response) through the busy wait loop, the primary scheduler would enqueue the request and, at a suitable time (e.g., when PMI has completed execution of a previous request), dequeue and begin executing the request. When a response to the request is received from a Management Information Server 306, the primary scheduler would execute the callback function associated with the request. Use of the busy wait loop, however, may be computationally inefficient. Additionally, because conventional PMI is not presently thread-safe, the distribution of PMI program execution among multiple threads may present problems such as data inconsistencies and data access collisions.

One approach to solving these problems is to restrict all PMI-related program execution to a single, dedicated PMI thread. Multi-threaded manager applications 206c may interact with a secondary scheduler 606 to route PMI requests (including callback functions) 621 to a primary scheduler 610 in a thread-safe and efficient manner. The PMI requests 621 may include management operations such as "get," "set," "create," "delete," etc., to be executed on managed objects 650. The PMI requests 621 may then be executed by the dedicated PMI thread.

In one embodiment, a system for using a management interface such as PMI in a thread-safe manner may include a primary scheduler 610 comprising a primary queue 612. In one embodiment, the primary scheduler 610 is executable in the single, dedicated PMI thread to which all PMI-related program execution may be restricted. In one embodiment, the primary scheduler 610 is the conventional PMI primary scheduler discussed above. The system may also include a secondary scheduler 606 comprising a secondary queue 608. The secondary scheduler 606 is executable to regulate the flow of management requests 621 from manager applications 206c to the primary scheduler 610. Therefore, only one thread may access the primary scheduler 610 at a time to ensure thread safety. Access to the secondary scheduler 606 for the manager applications 206c may be provided by an API or other suitable interface, such as PMI. In one embodiment, in other words, the manager applications 206c may call functions of or otherwise pass parameters to an API or interface such as PMI in order to schedule management requests 621. Because a manager application 206c schedules a management request 621 with the secondary scheduler 606 by acquiring the lock, simply placing the request 621 on the queue 608, and releasing the lock, a computationally inefficient use of a dispatch request loop running for a particular number of loops may be avoided. Furthermore, the conventional PMI scheduler and interface may be used without modification of existing program code.

FIG. 7 is a flowchart illustrating a method for scheduling management requests 621 in a thread-safe and efficient manner. In 702, the secondary scheduler 606 may receive the management requests 621 from one or more multi-threaded manager applications 206c in a thread-safe manner, such as through a lock or other suitable mechanism. In one embodiment, a thread of a manager application 206c may lock the secondary scheduler 606, place the request, and then release the lock. In 704, the request 621 may be enqueued in the secondary queue 608 of the secondary scheduler 606. In one embodiment, the secondary scheduler 606 monitors the flow of PMI-related requests 621 into PMI (e.g., the PMI thread) to ensure that, at any point in time, only one management request (e.g., callback function) 621 is being processed by PMI (e.g., by the PMI thread).

When a request 621 in the secondary queue 608 is ready for scheduling with the primary scheduler 610, the request 621 may be dequeued from the secondary queue 608 in 706. In one embodiment, a communication pipe 640 may be created to link the primary scheduler 610 and the secondary scheduler 606. In 708, the communication pipe 640 may be used to wake the primary scheduler 610 and pass control to it whenever a management request 621 needs to be scheduled with the primary scheduler 610.

In 710, the secondary scheduler 606 may then access the primary scheduler 610 in a thread-safe manner, such as through a lock or other suitable mechanism, to send the request 621 to the primary scheduler 610. In one embodiment, the secondary scheduler 606 may be multi-threaded and may include a thread devoted to placing requests 621 with the primary scheduler 610. In one embodiment, the secondary scheduler 606 may lock the primary scheduler 610, place the request, and then release the lock. In this way, the scheduling of requests 621 by the manager applications 206c with PMI is performed in a thread-safe manner. In various embodiments, 706 through 710 may be thought of as essentially being one continuous step, or 706 through 710 may be performed in a different order.

Furthermore, the performance and efficiency of the manager applications 206c may be enhanced by increasing the responsiveness of interaction between the manager applications 206c and the schedulers 606 and 610. In other words, the secondary scheduler 606 is locked only while a request 621 is being enqueued on the secondary queue 608, while the primary scheduler 610 may be locked or otherwise unavailable for longer times, such as during execution of requests 621 pending on the primary queue 612. Therefore, the multiple threads of one or more manager applications 206c need only wait for a request 621 to be enqueued rather than for the request 621 to be executed before the threads may proceed with their other duties. In one embodiment, the secondary scheduler 606 may be multi-threaded to further improve the performance of the manager applications 206c.

In 712, the management requests 621 may be dequeued from the primary queue 612 and sent sequentially (i.e., in a proper order relative to other requests 621) to or otherwise executed on one or more managed objects 650. The managed objects 650 may include, for example, one or more objects corresponding to a telephone network and/or a telecommunications device. In one embodiment, the managed objects 650 are managed by or through a Management Information Server (MIS) 306. In one embodiment, the MIS 306 is coupled to the primary scheduler 610 through a management interface such as PMI, and the primary scheduler 610 is operable to send the management requests 621 to the one or more managed objects 650 through the MIS 306. In one embodiment, the management requests 621 comprise callback functions, wherein the callback functions are executable by PMI to send and receive management information to and from the MIS 306. In 714, the MIS 306 is operable to send and receive the management information to and from the managed objects 650 to carry out the management requests 621.

Additionally, the resources MIS 306 and/or managed objects 650 may generate responses 631 upon receipt and processing of the requests 621. The primary scheduler 610 may listen for responses 631 from the MIS 306. Upon receipt of a response 631, the primary scheduler 610 may find and execute the appropriate callback function to send the appropriate response 631 back to the appropriate manager application 206c in a thread-safe and efficient manner similar to the one described above. In one embodiment, the responses 631 may be enqueued in the same primary queue 612 as the requests 612 pending execution of the appropriate callback functions.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A thread-safe scheduler system, comprising:
at least one processor; and
memory coupled to the at least one processor, wherein the memory is configured to store program instructions executable by the at least one processor to implement:
a primary scheduler which is executable to schedule requests for networked data resources; and
a secondary scheduler, wherein the secondary scheduler is executable to receive a plurality of requests from a multi-threaded application in a thread-safe manner and send the requests received from the multi-threaded application to the primary scheduler in a thread-safe manner;
wherein the requests comprise callback functions, and wherein the callback functions are executable to send responses to the requests to the multi-threaded application.

2. The system of claim 1, wherein the primary scheduler is single-threaded.

3. The system of claim 1, wherein the secondary scheduler is multi-threaded.

4. The system of claim 1, wherein the secondary scheduler is executable to receive the plurality of requests from the multi-threaded application through a lock in a thread-safe manner.

5. The system of claim 1, wherein the primary scheduler is executable to receive the plurality of requests from the secondary scheduler through a lock in a thread-safe manner.

6. The system of claim 1, wherein the resources comprise a management information server, wherein the requests received from the multi-threaded application comprise management requests, and wherein the multi-threaded application comprises a multi-threaded manager application.

7. The system of claim 1, wherein the program instructions are executable by the at least one processor to further implement:
a management information server coupled to the primary scheduler through a management interface, wherein the primary scheduler is operable to send the requests from the secondary scheduler to one or more managed objects through the management information server.

8. The system of claim 7, wherein the managed objects comprise one or more objects corresponding to a telephone network.

9. The system of claim 7, wherein the managed objects comprise an object corresponding to a telecommunications device.

10. The system of claim 7, wherein the management interface comprises Portable Management Interface (PMI), wherein PMI is single-threaded, and wherein PMI comprises a plurality of functions which are operable to carry out the requests.

11. The system of claim 1, wherein the primary scheduler comprises a primary queue which is operable to hold pending requests and responses to the requests.

12. The system of claim 1, wherein the secondary scheduler comprises a secondary queue which is operable to hold pending requests.

13. The system of claim 1, wherein the program instructions are executable by the at least one processor to further implement:
a communication pipe between the primary scheduler and secondary scheduler, wherein the secondary scheduler uses the communication pipe to wake the primary scheduler prior to sending one of the requests to the primary scheduler.

14. A thread-safe method for using a management interface for management of a plurality of managed objects on a network, the method comprising:
receiving a plurality of management requests from a multi-threaded manager application into a secondary scheduler in a thread-safe manner;
scheduling the plurality of management requests in a secondary queue in the secondary scheduler after receiving the management requests from the manager application;
sending the management requests from the secondary scheduler to a primary scheduler in a thread-safe manner;
scheduling the management requests in a primary queue in the primary scheduler, wherein each of the management requests comprises a corresponding callback function; and
executing the management requests on the managed objects after scheduling the management requests in the primary queue.

15. The method of claim 14, wherein executing the management requests on the managed objects further comprises sending the management requests to a management information server coupled to the managed objects.

16. The method of claim 14, further comprising:
receiving a response to one of the management requests from one of the managed objects after executing that management requests on one of the managed objects; and
executing the corresponding callback function for that management request to send the response to the multi-threaded manager application.

17. The method of claim 16, further comprising:
enqueueing the response in the primary queue after receiving the response from one of the managed objects;
finding the callback function corresponding to the response after enqueuing the response; and
dequeueing the response from the primary queue before executing the corresponding callback function to send the response to the multi-threaded manager application.

18. The method of claim 14, wherein the management interface comprises Portable Management Interface (PMI), wherein PMI is single-threaded, and wherein PMI comprises a plurality of functions which are operable to execute the management requests.

19. The method of claim 14, wherein the managed objects comprise one or more objects corresponding to a telephone network.

20. The method of claim 14, wherein the managed objects comprise an object corresponding to a telecommunications device.

21. The method of claim 14, wherein the receiving the plurality of management requests from the multi-threaded manager application into the secondary scheduler in the thread-safe manner comprises receiving the plurality of management requests through a thread-safe lock.

22. The method of claim 14, wherein sending the management requests to the primary scheduler in the thread-safe manner comprises dispatching the management requests through a thread-safe lock.

23. The method of claim 14, wherein the primary scheduler is executed in a single thread associated with the management interface, and wherein the secondary scheduler is executed in at least one different thread.

24. The method of claim 14, wherein the secondary scheduler is multi-threaded.

25. A tangible, computer-readable storage medium comprising program instructions, wherein the program instructions are computer-executable to implement:
   receiving a plurality of management requests from a multi-threaded manager application into a secondary scheduler in a thread-safe manner;
   scheduling the plurality of management requests in a secondary queue in the secondary scheduler after receiving the management requests from the manager application;
   sending the management requests from the secondary scheduler to a primary scheduler in a thread-safe manner;
   scheduling the management requests in a primary queue in the primary scheduler, wherein each of the management requests comprises a corresponding callback function; and
   executing the management requests on the managed objects after scheduling the management requests in the primary queue.

26. The tangible, computer-readable medium of claim 25, wherein executing the management requests on the managed objects further comprises sending the management requests to a management information server coupled to the managed objects.

27. The tangible, computer-readable medium of claim 25, wherein the program instructions are further executable to implement:
   receiving a response to one of the management requests from one of the managed objects after executing that management request on one of the managed objects; and
   executing the corresponding callback function for that management request to send the response to the multi-threaded manager application.

28. The tangible, computer-readable medium of claim 27, wherein the program instructions are further executable to implement:
   enqueueing the response in the primary queue after receiving the response from one of the managed objects;
   finding the callback function corresponding to the response after enqueuing the response; and
   dequeueing the response from the primary queue before executing the corresponding callback function to send the response to the multi-threaded manager application.

29. The tangible, computer-readable medium of claim 25, wherein the management interface comprises Portable Management Interface (PMI), wherein PMI is single-threaded, and wherein PMI comprises a plurality of functions which are operable to execute the management requests.

30. The tangible, computer-readable medium of claim 25, wherein the managed objects comprise one or more objects corresponding to a telephone network.

31. The tangible, computer-readable medium of claim 25, wherein the managed objects comprise an object corresponding to a telecommunications device.

32. The tangible, computer-readable medium of claim 25, wherein the receiving the plurality of management requests from the multi-threaded manager application into the secondary scheduler in the thread-safe manner comprises receiving the plurality of management requests through a thread-safe lock.

33. The tangible, computer-readable medium of claim 25, wherein sending the management requests to the primary scheduler in the thread-safe manner comprises dispatching the management requests through a thread-safe lock.

34. The tangible, computer-readable medium of claim 25, wherein the primary scheduler is executed in a single thread associated with the management interface, and wherein the secondary scheduler is executed in at least one different thread.

35. The tangible, computer-readable medium of claim 25, wherein the secondary scheduler is multi-threaded.

* * * * *